United States Patent [19]

Glennon et al.

[11] Patent Number: 4,931,893
[45] Date of Patent: Jun. 5, 1990

[54] LOSS OF NEUTRAL OR GROUND PROTECTION CIRCUIT

[75] Inventors: Oliver Glennon, Ballinasloe, Ireland; Henry J. Zylstra, Alburnett, Iowa

[73] Assignee: Square D Company, Palatine, Ill.

[21] Appl. No.: 340,302

[22] Filed: Apr. 19, 1989

[51] Int. Cl.⁵ .............................................. H02H 3/16
[52] U.S. Cl. ...................................... 361/45; 361/50; 340/649; 340/652
[58] Field of Search ............... 361/42, 45, 47–50, 361/86; 307/127; 340/649, 652, 662

[56] References Cited

U.S. PATENT DOCUMENTS

| | | | |
|---|---|---|---|
| 3,922,659 | 11/1975 | Dighe | 346/652 |
| 3,973,171 | 8/1976 | Howell | 361/45 |
| 3,987,341 | 10/1976 | Clark | 361/50 |
| 4,011,483 | 3/1977 | Meadows | 340/652 X |
| 4,598,331 | 7/1986 | Legatti | 361/45 X |

Primary Examiner—Todd E. Deboer
Attorney, Agent, or Firm—Jose W. Jimenez

[57] ABSTRACT

A loss of neutral or ground protection circuit is disclosed which uses a simple capacitive circuit which discharges through the neutral or ground leads in normal conditions, and in the event of loss of neutral or ground charges sufficiently to trip a circuit breaker. The protection circuit may include other circuits such as ground fault detection circuits and may be in a one or three phase system. By virtue of the fact that a capacitive circuit is used to trip the circuit breaker, an inherent time delay is involved and thus the circuit breaker will not be tripped as a result of a momentary loss of neutral or ground. This is particularly important where continuity of operation of a load is important.

15 Claims, 6 Drawing Sheets

LOSS OF NEUTRAL OR GROUND PROTECTION CIRCUIT

FIELD OF THE INVENTION

The invention relates to electrical protection circuits generally and more specifically to loss of neutral or ground protection circuits.

BACKGROUND OF THE INVENTION

Generally speaking, presently available protection circuits such as earth leakage circuit breakers (ELCB's) operate quite satisfactorily in detecting faults such as ground faults and overloads. Other faults which may occur are opening of the line neutral or ground leads. In the first mentioned situation there is little hazard present, however, in the case of loss of the neutral connection the line voltage still remains. Loss of ground is clearly also quite hazardous.

In an attempt to overcome this problem, protection circuits have been devised which provide loss of neutral or ground protection. For example, U.S. Pat. No. 4,598,331 (Legatti) describes such a circuit. The Legatti protection circuit includes a differential transformer with a pair of opposed primary windings and a secondary winding for detection of ground faults and an additional supplemental winding between the neutral and ground leads for detection of open neutral or ground connections. Another example of a protection circuit which provides loss of neutral or ground protection is that described in European Patent Specification No. 154,450 (Delta). This circuit has a circuit breaker with two SCR's, one for tripping on detection of a ground fault, and a second for tripping on detection of loss of neutral or ground.

While these circuits appear to be effective, they suffer from the disadvantage of being relatively complex. In the Legatti circuit, for example, a winding, resistors and diodes are required, whereas in the Delta circuit a separate SCR is required. Further, in the prior art, disconnection of the line lead is instantaneous on detection of loss of neutral, which is not satisfactory when continuity of operation of electrical equipment is required when loss of neutral is only momentary.

SUMMARY OF THE INVENTION

According to the invention there is provided a loss of neutral or ground protection circuit having line, neutral and ground leads between a source of energy and a load comprising a circuit breaker for opening the line lead on reception of an energizing signal, and control means for controlling operation of the circuit breaker, said control means comprising a capacitive circuit arranged to be charged by the line lead, and to subsequently discharge through the neutral or ground lead, in which the capacitive circuit charges excessively on loss of the neutral or ground lead to provide a circuit breaker energizing signal.

Preferably, there is a capacitive circuit arranged to discharge through the neutral lead for detection of loss of neutral, and a separate capacitive circuit arranged to discharge through the ground lead for detection of loss of ground.

OBJECTS OF THE INVENTION

It is an object of the invention to provide a loss of neutral or ground protection circuit which is simple, reliable and inexpensive.

Another object is to provide for a time delay before tripping on loss of neutral or ground preferably without the use of additional components.

These and other features, advantages and objects of the invention will be more clearly understood from the following description of some preferred embodiments thereof, given by way of example only.

DETAILED DESCRIPTION OF THE PREFERRED EMBODIMENTS

Figure 1:
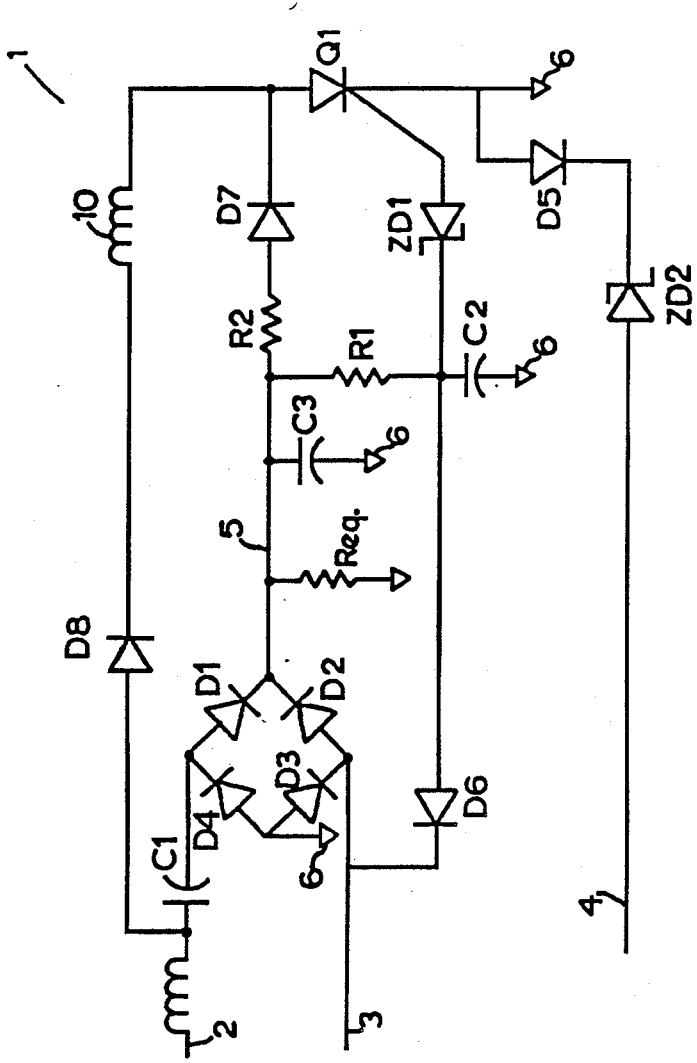
FIG. 1(a) is a circuit diagram of a loss of neutral protection circuit according to the invention.
FIG. 1(b) is a circuit diagram of a modification of the circuit of FIG. 1(a)

Referring now to FIG. 1(a), there is illustrated a loss of neutral protection circuit indicated generally by the reference numeral 1. The protection circuit 1 has a line lead 2, a neutral lead 3 and an earth lead 4. A bridge rectifier comprising diodes D1 to D4 is connected across the line lead 2 and the neutral lead 3 for DC output at a positive terminal 5 and a negative terminal 6. A load connected across these output terminals is represented in the drawing by Req.

A capacitor Cl is connected in the line lead 2 to provide isolation from a high DC voltage, such as in a dielectric or insulation test.

The protection circuit 1 further includes a circuit breaker comprising a solenoid 10 operating a mechanism (not shown) which opens contacts in the line lead 2, connected to an SCR Q1, the gate of which is connected to a Zener diode ZD1. The cathode of the SCR Q1 is connected to both the earth lead 4 via a diode D5 and to the negative rectifier terminal 6. A Zener diode ZD2 is connected in the earth lead 4.

The circuit 1 further provides control means via a capacitor C2 connected at one side to the DC negative terminal 6 and at the other side to the DC positive terminal 5 through a resistor R1. This side of the capacitor C2 is also connected to the Zener diode ZD1 and to the anode of a diode D6 which is, in turn, connected to the neutral lead 3.

A holding circuit for the SCR Q1 is provided by a capacitor C3 across the DC positive and negative terminals 5 and 6, and connected to the anode of the SCR Q1 by a resistor R2 and a diode D7.

In operation, there is little potential between the neutral lead 3 and the DC negative terminal 6, and in normal conditions the capacitor C2 charges through R1 in the negative half cycle of the AC supply when the line lead is at a negative potential with respect to the neutral lead. During the subsequent positive half cycle however, the diode D6 is forward biased and C2 discharges through D6 to the neutral lead 3. The circuit breaker will not be activated as the maximum voltage across C2 never exceeds the tripping level for the SCR Q1, as set by the Zener diode ZD1.

If, however, the neutral lead 3 is opened, the discharging path through D6 is not available to the capacitor C2 and it continues to charge until the breakdown voltage of ZD1 is exceeded. This forms a voltage energizing signal for the circuit breaker as the SCR Q1 is triggered. The solenoid 10 is energized to open the line lead 2 by a current flowing through the diode D8, solenoid 10, SCR Q1, diode D5 and the Zener diode ZD2 to earth. The diode D5 isolates the circuit during the negative half cycle and the Zener diode ZD2 prevents current flow to earth during normal operation without loss of neutral, which current flow may cause tripping of upstream ELCB'S. The time delay between loss of neutral and operation of the circuit breaker is set by the values of the capacitor C2, the resistor R1 and the Zener diode ZD1.

On loss of neutral, the diode D5 acts both to provide a current path for the SCR Q1 to earth and to provide for continued rectification with line and earth inputs.

The holding circuit formed by the capacitor C3, the resistor R2 and the diode D7 holds the SCR Q1 in conduction during the negative half cycle. This is achieved by storage of charge in C3.

Figure 1B:
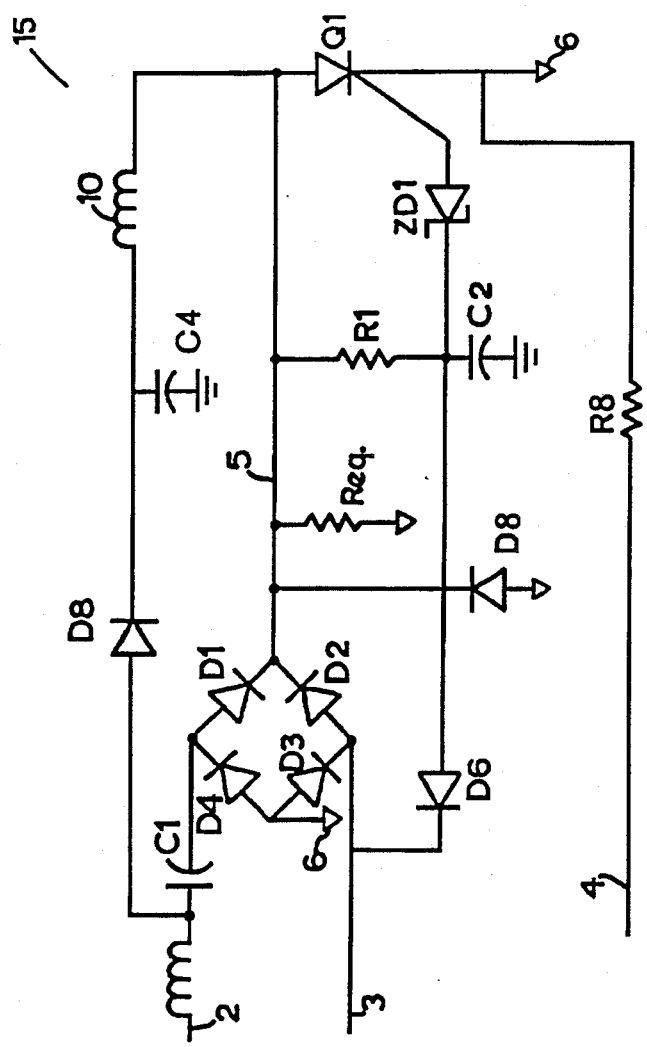

Referring now to FIG. 1(b), there is illustrated a protection circuit 15 which is slightly different from that shown in FIG. 1(a). Parts similar to those described with reference to FIG. 1(a) are identified by the same reference numerals. The protection circuit 15 includes a storage capacitor C4 connected between the output of the diode D8 and earth. The diode D5 and the Zener diode ZD2 are replaced by a resistor R8, and the capacitor C3, the resistor R2 and the diode D7 are deleted.

In operation, the storage capacitor C4 holds the SCR Q1 in the conducting state during the negative half cycle and thus there is no need for continued rectification, as with the circuit 1. The resistor R8 provides a reference to earth, and in the event of loss of neutral, the capacitor C2 charges through R1 and R8.

Figure 2:
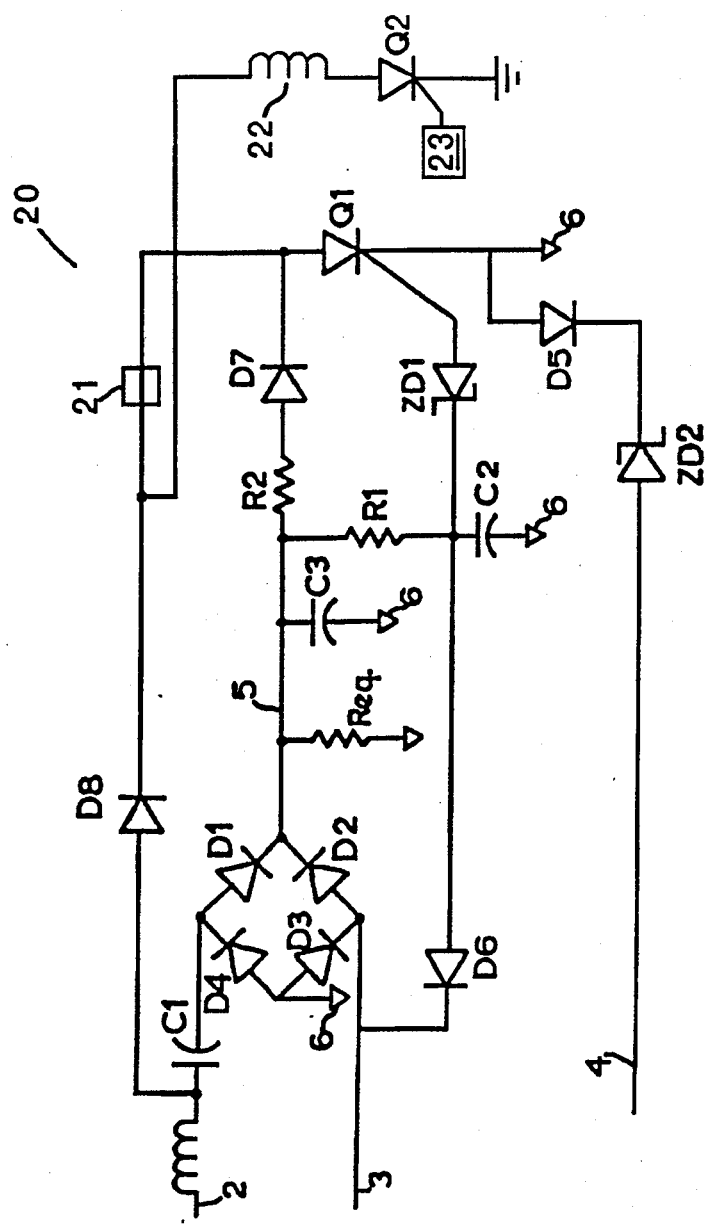
FIGS. 2, 3 and 4 are circuit diagrams of alternative arrangements of loss of neutral protection circuit according to the invention.

Referring now to FIG. 2 there is illustrated an alternative construction of loss of neutral protection circuit, indicated generally by the reference numeral 20. Parts similar to those described in FIG. 1 are assigned the same reference numerals and letters. The differences between the circuits 1 and 20 are that in the latter the solenoid 10 is replaced by an alarm indicator 21 which may be a light or sound emitter. A separate solenoid 22 and SCR Q2 are connected between the line lead 2 and earth for opening of the line lead on detection of a ground fault by a ground fault sensing circuit 23 of any conventional construction.

The circuit 20 allows continuity of operation on the occurrence of a loss of neutral and will open the line lead 2 only in the event of a ground fault. It is envisaged, therefore, that the circuit 20 would be useful where continuity of operation of the load is important.

Figure 3:
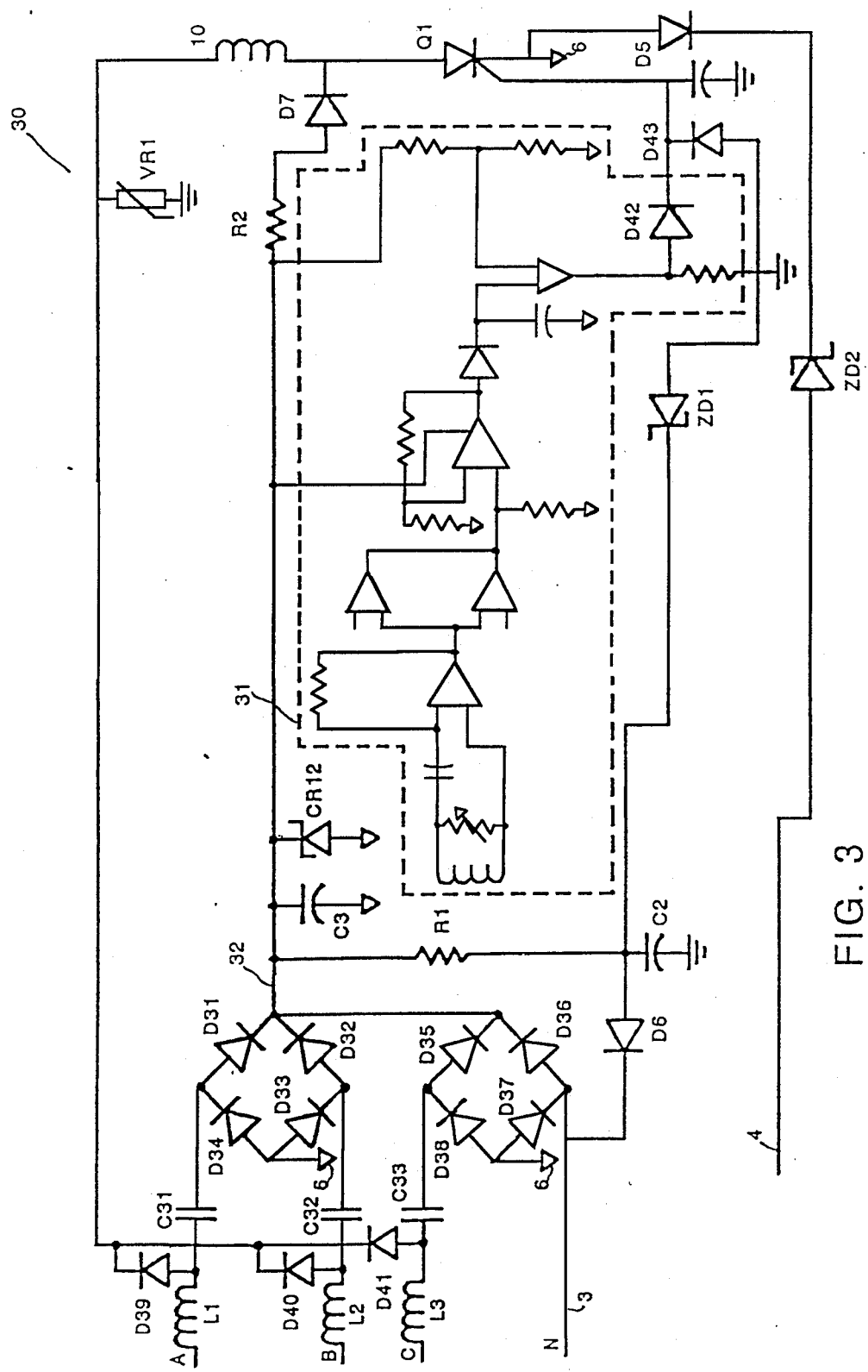

The protection circuits of the invention may include other fault detection circuits connected to the circuit breaker and referring to FIG. 3 there is illustrated such a protection circuit, indicated generally by the reference numeral 30. Parts similar to or which serve the same function as parts described with reference to the previous drawings are identified similarly. In this embodiment, loss of neutral protection is provided for a three phase supply connected to line leads A, B and C which have coupling capacitors C31, C32 and C33, respectively. DC power is provided by two bridge rectifiers formed by diodes D31 to D34 and D35 to D38. The positive output from both bridge rectifiers are connected at a positive terminal 32. A ground fault detection circuit 31 (indicted by interrupted lines) is arranged to independently trigger the SCR Q1 on detection of a ground fault. The ground fault detection circuit 31 is of conventional construction and requires no further description.

In operation, sufficient power is provided by any one of the three phases to operate the circuit. The capacitor C2 remains at almost ground potential except when a loss of neutral occurs, in which case it will charge through R1 and trigger the SCR Q1 through the Zener diode ZD1. As before, the time delay is determined by the values of the resistor R1, the capacitor C2 and the Zener diode ZD1. During the tripping event, the solenoid 10 will be supplied by current from one of the phases. On loss of neutral, an energizing circuit for the circuit breaker will be completed through the solenoid 10, the SCR Q1, the diode D5 and the Zener diode ZD2 to earth. In this embodiment, however, operation of the circuit breaker may also be in response to a ground fault and in this case the energizing circuit would be completed through the solenoid 10, the SCR Q1, and the bridge rectifier negative output to neutral.

Figure 4:
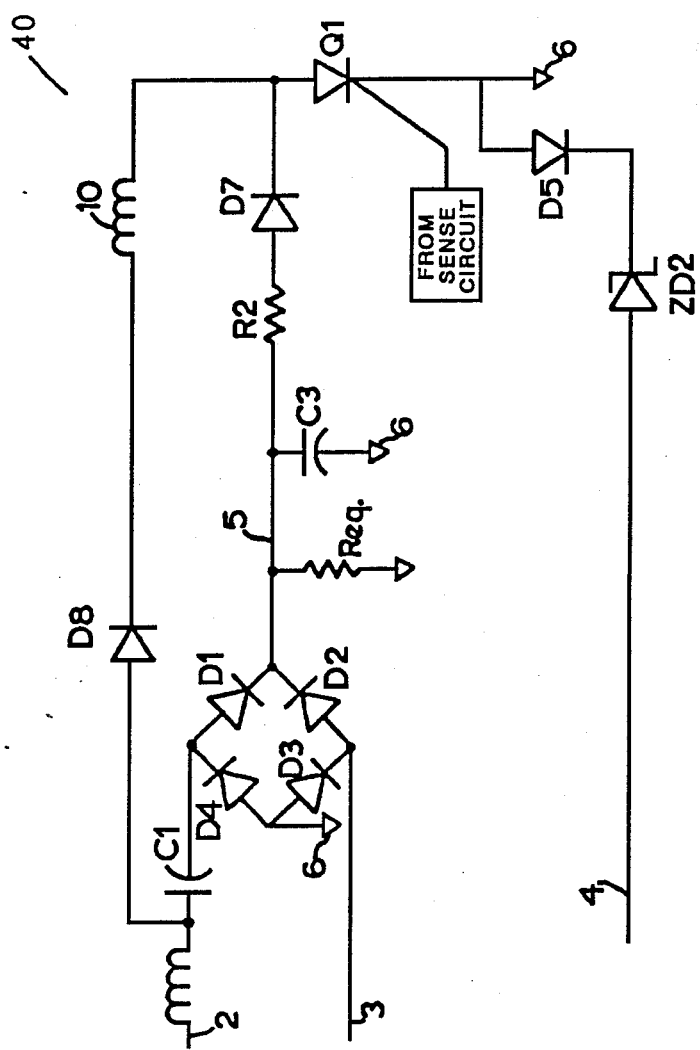

Referring now to FIG. 4, there is illustrated a further construction of protection circuit according to the invention, indicated generally by the reference numeral 40. Again, parts similar to those described with reference to the previous drawings are identified similarly. The protection circuit 40 does not include a capacitor, diode and resistor arrangement for detection of loss of neutral. A sense circuit of any conventional construction is provided with power through the coupling capacitor C1, the diode D1, the diode D5 and the Zener diode ZD2.

The invention is not limited to the examples shown in the drawings, for example, any type of fault detection circuit may be included in addition to the loss of neutral detection circuit. Further, any type of circuit breaker may be used, for example, the SCR may be replaced by a VMOS transistor.

Figure 5:
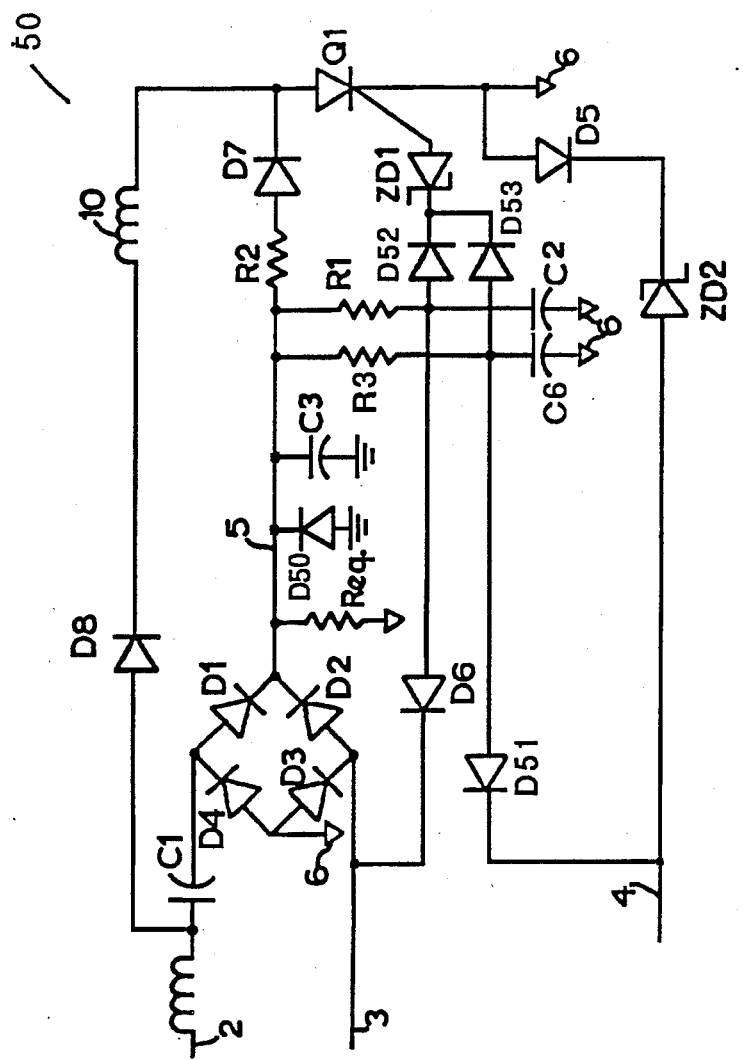
FIG. 5 is a circuit diagram of a loss of neutral or ground protection circuit according to the invention.

The protection circuit may be adapted to provide loss of ground protection in addition to or instead of, loss of neutral protection. A protection circuit 50 to provide loss of neutral and/or ground protection is illustrate in FIG. 5, in which parts similar to those described with reference to the previous drawings are identified by the same reference numerals. The protection circuit 50 includes a capacitor C6 connected at one side to the positive terminal 5 by a resistor R3 and on the other side to the negative terminal 6, in similar manner to the capacitor C2. Instead of being connected to the neutral lead 3, however, the capacitor C6 is connected to the ground lead 4 via a diode D51. A pair of diodes D52 and D53 provide rectification for the connection of the capacitors C2 and C6 to the Zener diode ZD1 The positive terminal 5 is connected to the earth via a reverse biased diode D50.

In normal operation, the capacitors C2 and C6 are charged through R1 and R3 respectively during the negative half cycle and are discharged during the positive half cycle through D6 and D51, respectively. On loss of neutral, tripping of the SCR Q 1 is as described above and on loss of ground, the discharge of C6 during the positive half cycle does not occur and when the voltage across C6 exceeds the Zener voltage of ZD1 and the signal diode D53, the SCR Q 1 is triggered. In the event of loss of ground, an energizing path for the SCR Q 1 is completed to the negative lead, as in normal operation.

It will be appreciated that the invention provides an extremely simple loss of neutral or ground protection circuit with a small number of simple components, and it is thus inexpensive and reliable. The fact that there is an adjustable time delay before operation of the circuit breaker is a distinct advantage where continuity of operation of the load is important in the event of momentary loss of neutral or ground. Finally, this time delay may be easily set by appropriate selection of the relevant components.

Various changes, modifications and variations may be made to the arrangements described without departing from the scope of the invention.

What is claimed is:

1. A loss of neutral or ground protection circuit in a system having line, neutral and ground leads between a source of energy and a load, said protection circuit comprising:
    a device for opening the line lead or indicating a fault on reception of an energizing signal; and
    control means for controlling operation of said device, said control means comprising a capacitive circuit arranged to be charged by the line lead, and to subsequently discharge through the neutral lead for detection of loss of neutral or through the ground lead for loss of ground detection, in which the capacitive circuit charges on loss of the neutral lead or loss of the ground lead to provide an energizing signal for said device.

2. The protection circuit as recited in claim 1 wherein said energizing signal is a voltage signal above a present tripping voltage level.

3. The protection circuit as recited in claim 2 wherein said tripping voltage level of the energising signal applied to said circuit breaker is set by a voltage regulator connected to said circuit breaker.

4. The protection circuit as recited in claim 3 wherein said voltage regulator is a Zener diode.

5. The protection circuit as recited in claim 1 further comprising a full wave rectifier connected to the line and neutral leads for supply of DC energy to a load via positive and negative supply terminals, in which the capacitive circuit is connected to the output of the full wave rectifier and is connected to the neutral lead or to the ground lead through a forward biased diode.

6. The protection circuit as recited in claim 5 wherein said capacitive circuit is connected to the positive terminal of the rectifier through a resistive circuit so that in use the capacitive circuit charges through the resistive circuit.

7. The protection circuit as recited in claim 1 wherein said device is coupled to the earth lead by a voltage regulator arranged to prevent flow of current to earth except during operation of said circuit breaker.

8. The protection circuit as recited in claim 7 wherein said voltage regulator is a Zener diode.

9. The protection circuit as recited in claim 7 wherein said voltage regulator is a resistor.

10. The protection circuit as recited in claim 1 wherein said device comprises a silicon controlled rectifier operatively coupled to a solenoid arranged to open the line lead, the energising signal being applied to the gate of said silicon controlled rectifier.

11. The protection circuit as recited in claim 10 wherein a capacitive storage circuit is connected to the anode of said silicon controlled rectifier for maintaining said silicon controlled rectifier in conduction during the negative half cycle of the AC supply.

12. The protection circuit as recited in claim 11 wherein the line lead is connected to the anode of the SCR via a forward biased diode, and the storage capacitive circuit is connected between the cathode of the diode and the ground lead.

13. The protection circuit as recited in claim 1 wherein the line lead is connected to an AC energy source through a coupling capacitor to provide protection from DC applied to the circuit.

14. The protection circuit as recited in claim 1 wherein loss of neutral protection only is provided.

15. The protection circuit as recited in claim wherein loss of ground protection only is provided.

* * * * *